S. S. & G. W. COLE.
Preserving Apples.

No. 43,973.  Patented Aug. 30, 1864.

Witnesses:  Inventor:

UNITED STATES PATENT OFFICE.

SAMUEL S. COLE AND GIDEON W. COLE, OF CANTON, ILLINOIS.

APPLE-BIN.

Specification forming part of Letters Patent No. 43,973, dated August 30, 1864.

*To all whom it may concern:*

Be it known that we, SAMUEL S. COLE and GIDEON W. COLE, of Canton, in the county of Fulton and State of Illinois, have invented a new and Improved Method of Preventing Apples from Decaying, and of Preserving their Flavor; and we do hereby declare that the following is a full and exact description thereof, reference being had to the accompanying drawings, and to the letters of reference thereon, in which—

Figure 1:
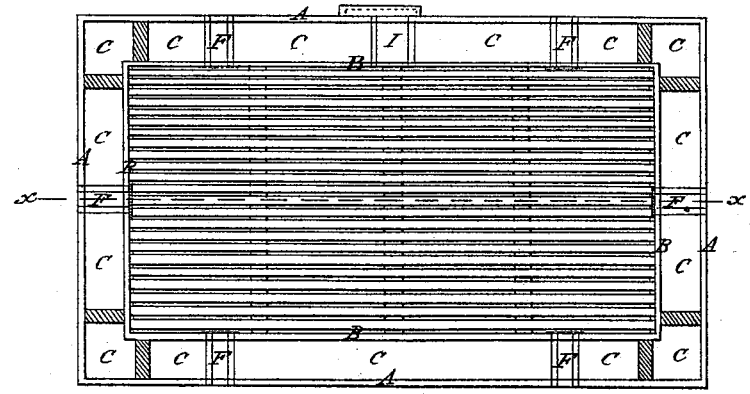
Figure 3:
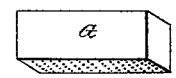
Figure 4:
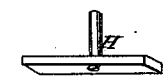
Figure 2:
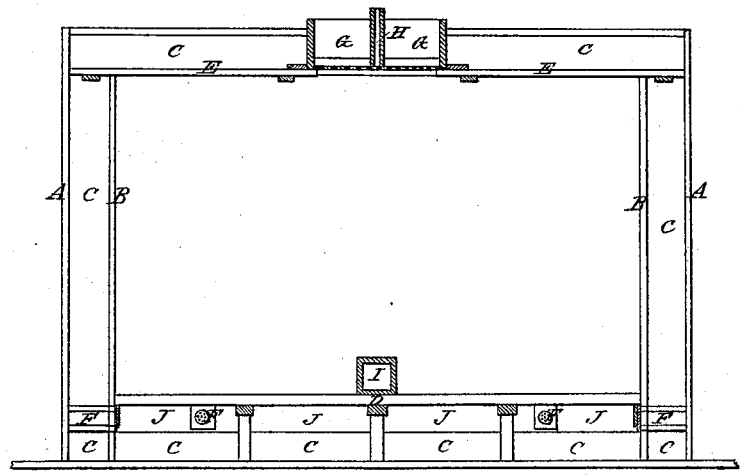

Figure 1 is a vertical view of the bin with the top removed. Fig. 2 is a horizontal view, as cut in X X. Fig. 3 is the ventilator, and Fig. 4 the ventilating-pipe.

The nature of our invention consists in so constructing and afterward ventilating an apple-bin that when the "sweating" has ceased the apples are left dry and cool, and after freezing weather comes they are so frozen and so kept that their flavor is retained and they are preserved from decay until late in the summer.

To enable others skilled in the art to make and use our invention, we will proceed to describe its construction and manner of using.

In some barn, crib, shed, or out-building affording protection from rain and free circulation of air, we set the bin, made with outer, A, and inner, B, common board walls, leaving a space, C, of eight to ten inches, which we fill with clean sawdust or other good non-conductor. We spread a like thickness of sawdust upon a board floor, and then make a slat floor, D, so placed as to prevent the apples from falling through, yet affording a thorough ventilation from the air-chamber J upward between the slats, from the opposite air-tubes F F F F F F, which connect the outer and inner walls of the bin, the inner ends of which are covered with wire screen, perforated tin, or other metal, to prevent the entrance of rats or mice. The top E is made of jointed boards, and rests upon the inner walls, which should be lower than outside ones. In the center of the top we cut a rectangular opening of about eighteen by twenty-four inches, (according to the capacity of the bin,) and which may be used for entering the bin by taking out the ventilator G, and over the opening above named, and as a continuation thereof, we place a box-ventilator, G, with its lower side covered with wire screen, perforated tin, &c.; but the top side is to be open, and we secure it in its place by bearers or cleats nailed to the top E. These bearers may extend high enough to prevent sawdust from falling into the bin when the ventilator G is removed. The ventilating-pipe H is about one inch in diameter on the inside, (more or less, according to size of bin,) and it passes through the center of a board which fits the inside of the box G. The apple-hole I is a box of about six inches square, connecting outer and inner walls, and through which the fruit may be taken from the bin, the outer end to be covered by a slide-door. This (I) may also be used as a ventilating or air tube, when apples are sweating, by covering outer end by wire screen.

The manner of using the bin is as follows: The slatted floor should be covered with a light coating of straw, to prevent the bruising of the apples, which may be put in the bin as soon as they are gathered from the orchard. The top E is not to be placed on bin until the apples have been thoroughly sweated and they begin to freeze, or the rats and mice become very troublesome. In such event the top may be placed on (but no sawdust) and the ventilating-pipe taken out of ventilator. All the air-tubes are to be left open until the sweating is finished, and the apples become dry and cool, before which time they should not be frozen. Then protect the top E the same as sides and bottom, and keep the air-tubes sufficiently closed during cold weather to prevent freezing until midwinter, by which time the apples should be moderately frozen, and afterward especial care must be taken to close the air-tubes whenever it is thawing weather. Toward the close of the winter, when it is cold enough to freeze hard, open all the air-tubes and take out the ventilating-pipe for a few days, and let the apples freeze what they will; then fill the air-tubes with sawdust and stop up the mouths, insert the ventilating-piple, leaving no other opening, and fill the ventilator G with sawdust. The warm weather of summer will gradually extract the frost from the apples, the vapor passing out of the pipe H, and the apples will be found to have retained their original flavor. The surest guarantees of success are that the temperature is not materially increased by leaving the air-tubes open in thawing weather, after the apples have been once chilled or frozen, and securing a thorough freezing as late in the winter as possible of all the apples most exposed to the cold air.

We do not claim a bin or house with double walls and non-conductors between, for such have long been used for the preservation of ice and other commodities; but, Having specified the manner of constructing our bin and the process of ventilating and freezing the apples, what we do claim, and desire to secure by Letters Patent, is—

1. The principle and process of ventilating and freezing a bin or bulk of apples, substantially as set forth, for the purpose of preserving their flavor and preventing their decay until late in the ensuing summer.

2. The method and means, substantially as set forth, of so constructing a bin as to control the ventilation and freezing of apples, for the purposes herein set forth.

SAMUEL S. COLE.
GIDEON W. COLE.

Witnesses:
WM. H. HASKELL,
J. S. BLACK.